US012806830B2

(12) United States Patent
Lee et al.

(10) Patent No.: US 12,806,830 B2
(45) Date of Patent: Nov. 24, 2026

(54) APPARATUS AND METHOD FOR FORMING HYDROGEN TANK AND ASSEMBLING METHOD THEREOF

(71) Applicants: Hyundai Motor Company, Seoul (KR); Kia Corporation, Seoul (KR); Hanguk Mold Co., Ltd, Ulsan (KR)

(72) Inventors: Kyu Young Lee, Hwaseong-si (KR); Suk Joo Hong, Hwaseong-si (KR); Byoung Jin Kwon, Ulsan (KR); Ji Hun Kim, Ulsan (KR); Min Woo Chu, Ulsan (KR); Eui Hwan Son, Ulsan (KR); Jung Hwan Park, Ulsan (KR)

(73) Assignees: Hyundai Motor Company, Seoul (KR); Kia Corporation, Seoul (KR); Hanguk Mold CO., LTD, Ulsan (KR)

( * ) Notice: Subject to any disclaimer, the term of this patent is extended or adjusted under 35 U.S.C. 154(b) by 79 days.

(21) Appl. No.: 18/930,114

(22) Filed: Oct. 29, 2024

(65) Prior Publication Data

US 2025/0178256 A1 Jun. 5, 2025

(30) Foreign Application Priority Data

Dec. 5, 2023 (KR) ........................ 10-2023-0174418

(51) Int. Cl.

| | |
|---|---|
| ***H05B 6/14*** | (2006.01) |
| ***B29C 45/14*** | (2006.01) |
| ***B29C 45/36*** | (2006.01) |
| ***F17C 1/16*** | (2006.01) |
| *B29K 705/02* | (2006.01) |
| *B29L 31/00* | (2006.01) |

(52) U.S. Cl.

CPC .. *B29C 45/14065* (2013.01); *B29C 45/14311* (2013.01); *B29C 45/14598* (2013.01); *B29C 45/36* (2013.01); *F17C 1/16* (2013.01); *H05B 6/14* (2013.01); *B29C 2045/14877* (2013.01); *B29C 2045/366* (2013.01); *B29K 2705/02* (2013.01); *B29L 2031/7156* (2013.01); *F17C 2201/0109* (2013.01); *F17C 2203/0604* (2013.01); *F17C 2203/066* (2013.01); *F17C 2209/2118* (2013.01); *F17C 2209/232* (2013.01); *F17C 2221/012* (2013.01)

(58) Field of Classification Search

None

See application file for complete search history.

(56) References Cited

U.S. PATENT DOCUMENTS 8,906,287 B2 * 12/2014 Hatta ........................ F17C 1/16 264/154

2017/0175950 A1 6/2017 Chung et al.

FOREIGN PATENT DOCUMENTS

CN 106996511 A 8/2017

KR 20120133354 A 12/2012

(Continued)

*Primary Examiner* — Yung-Sheng M Tsui

(74) *Attorney, Agent, or Firm* — Slater Matsil, LLP

(57) ABSTRACT

An embodiment change core module of an injection mold for a hydrogen tank liner that is injection molded is provided. The change core module includes upper and lower change cores configured to hold a sealless nozzle inside the injection mold, wherein the injection mold comprises upper and lower molds, and wherein the sealless nozzle has a first temperature, and an induction heating device configured to inductively heat the sealless nozzle to a second temperature.

20 Claims, 21 Drawing Sheets

(56) References Cited

FOREIGN PATENT DOCUMENTS

| | | | |
|---|---|---|---|
| KR | 101221004 | B1 | 1/2013 |
| KR | 20230096211 | A | 6/2023 |

* cited by examiner

A : When variation in direction of current applied to coil channels adjacent to each other may be 180 °, induction heating on plane surface may not occur B : As distance between coil channels adjacent to each other becomes shorter, unheated area may increase

APPARATUS AND METHOD FOR FORMING HYDROGEN TANK AND ASSEMBLING METHOD THEREOF

CROSS-REFERENCE TO RELATED APPLICATIONS

This application claims the benefit of Korean Patent Application No. 10-2023-0174418, filed on Dec. 5, 2023, which application is hereby incorporated herein for all purposes by this reference.

TECHNICAL FIELD

The present disclosure relates to an apparatus and method for forming a hydrogen tank and an assembling method thereof.

BACKGROUND

The statements in this section merely provide background information related to the present disclosure and may not constitute already known prior art.

The outer shell of the hydrogen tank for hydrogen electric vehicles may be reinforced with a fiber-reinforced composite material with high specific strength and specific rigidity to withstand the internal pressure of compressed gas, and a liner may be inserted into the hydrogen tank to seal the gas.

In addition, when a liner of a hydrogen tank is made of a plastic material such as a high-density polymer, a metal nozzle for connecting an external valve to the hydrogen tank may be applied, and because the plastic liner and the metal nozzle have been made of different materials, it may be difficult to achieve good adhesion at their interface.

In particular, as shown in FIGS. 1 and 2, in order to better seal hydrogen at the interface between a plastic liner 2 and an aluminum nozzle 3 of a hydrogen tank 1 for hydrogen electric vehicles, a separate highly elastic O-ring or an annular special seal 4 and 5 may be applied to the hydrogen tank.

Here, because hydrogen molecules are very small, even if various types of highly elastic O-rings or annular special seals 4 and 5 are applied, hydrogen gas may leak through the gap at the interface formed between the plastic liner 2 and the aluminum nozzle 3 under high pressure.

Moreover, the annular special seals 4 and 5 are very expensive, and, because the annular special seals 4 and 5 must be assembled manually on the plastic liner 2, which has been injection molded, excessive man-hours may be required.

In order to resolve the above-described technical problem, as shown in FIG. 3, a plastic liner 11 and a sealless aluminum nozzle 10 may be bonded and molded to form an interface joint 12 so that it may be possible to seal hydrogen at the interface.

As shown in FIGS. 4A-4C, the process of bonding and molding them may be as follows: in the step shown in FIG. 4A, the sealless aluminum nozzle 10 is heated to 170° C. in an oven 20, in the step shown in FIG. 4B, the sealless aluminum nozzle 10 heated to 170° C. is carried, and, in the step shown in FIG. 4C, insert injection molding for the liner is performed with the sealless aluminum nozzle 10, which has been carried and inserted into a liner injection molding machine 21.

However, in the case of the above-described injection molding method, in the process of taking out the sealless aluminum nozzle 10 from the oven 20 and inserting it into the liner injection molding machine 21, the aluminum nozzle 10 may be cooled below a required temperature.

In particular, when the sealless aluminum nozzle 10 is injection molded with a liner at a temperature of approximately 160° C. or lower, the bonding strength at the interface joint 12 may decrease and hydrogen may be less sealed.

In addition, in the case of the above-mentioned injection molding method, in the step shown in FIG. 4B, workers may be exposed to the risk of safety accidents in the process of transporting the sealless aluminum nozzle 10 heated to 170° C.

Moreover, the process of heating the nozzle in FIG. 4A, the process of carrying the heated nozzle in FIG. 4B, the process of inserting the heated nozzle in FIG. 4C, etc. may excessively increase the total cycle time required to produce the product.

Furthermore, the sealless aluminum nozzle 10 may be produced in various designs, and, each time each design is molded, it is necessary to replace a change core with a change core that matches the design.

For example, as shown in FIG. 5, to perform insert injection for an A-type sealless nozzle on an injection mold and then perform insert injection for a B-type sealless nozzle, injection work is stopped, A-type upper and lower change cores are separated from the injection mold, B-type upper and lower change cores are assembled into the injection mold, and the B-type sealless nozzle is inserted to carry out injection. Therefore, it may take at least an hour to replace change cores, resulting in a decrease in productivity.

The information included in this background section is only for enhancement of understanding of the general background of embodiments of the present disclosure and may not be taken as an acknowledgement or any form of suggestion that this information forms the already known prior art.

SUMMARY

The present disclosure relates to an apparatus and method for forming a hydrogen tank and an assembling method thereof. Embodiments relate to an injection mold for a liner of a hydrogen tank, and particular embodiments relate to a change core module of an injection mold for a hydrogen tank and a coupling apparatus therefor, wherein a plastic liner of the hydrogen tank is injection molded while heating a sealless aluminum nozzle to completely seal hydrogen at the interface between the plastic liner and the sealless aluminum nozzle.

Embodiments of the present disclosure can resolve problems occurring in the prior art.

Embodiments of the present disclosure provide a change core module of an injection mold for a hydrogen tank, where it may be possible to heat a sealless aluminum nozzle, which has been inserted into the injection mold, to a temperature of approximately 160° C. or higher by inductively heating a change core.

In addition, embodiments of the present disclosure provide a change core module coupling apparatus of an injection mold for a hydrogen tank for the purpose of combining or separating a change core module to easily replace the change core module including upper and lower change cores and a sealless aluminum nozzle inserted therebetween.

A change core module of an injection mold for a hydrogen tank liner according to embodiments of the present disclosure, in which the hydrogen tank liner is injection molded with a sealless nozzle positioned in the injection mold by the change core module, and in which the injection mold comprises upper and lower molds, may include upper and lower change core modules holding the sealless nozzle inside the injection mold and an induction heating unit configured to inductively heat the insert sealless nozzle.

A distance d between the induction heating unit and the insert sealless nozzle may be approximately 10 to 15 mm.

The induction heating unit may heat the insert sealless nozzle to a temperature of approximately 160° C. or higher.

The induction heating unit may arrange a coil in parallel.

The induction heating unit may arrange a coil into two or more parallel channels.

The two or more parallel channels may form a zigzag curve.

A coil of the induction heating unit may be arranged in such a way that there is no variation in vector in a current flow.

When the temperature of the insert sealless nozzle is measured to be approximately 160° C. or higher by an induction heating inlet line that has applied electricity to the induction heating unit, molding of a liner may begin as resin is injected.

A change core module coupling apparatus of an injection mold for a hydrogen tank liner, in which the hydrogen tank liner is injection molded with a sealless nozzle positioned in the injection mold by upper and lower change cores, and in which the injection mold comprises upper and lower molds, may include a horizontal movement pin configured to be built into the lower change core and horizontally moved by an ejector pin on a bottom plate and a vertical movement pin configured to be built into the lower change core, vertically moved by the horizontal movement pin, and inserted into a coupling hole of the upper change core.

A driving slope of the horizontal movement pin and a driven slope of the vertical movement pin may correspond to each other to slide.

The vertical movement pin may be elastically supported by a compression spring.

The vertical movement pin may be radially embedded in the lower change core and move in the radial direction of the lower change core.

A slot hole may be formed at the top of the vertical movement pin.

The upper change core may have a built-in slit bar penetrating the coupling hole thereof in the radial direction.

When the slot hole of the vertical movement pin is inserted into the coupling hole, the slit bar may penetrate the slot hole to fix the vertical movement pin.

The change core module and the coupling apparatus therefor of the injection mold for a hydrogen tank according to embodiments of the present disclosure may have practical effects. That is, it may be possible to better seal hydrogen by increasing the bonding strength at the interface joint between a plastic liner and a sealless aluminum nozzle and to easily replace a change core, significantly improving work efficiency and productivity for injection molding.

The methods and apparatuses of embodiments of the present disclosure have other features and advantages which will be apparent from or are set forth in more detail in the accompanying drawings, which are incorporated herein, and the following detailed description, which together serve to explain certain principles of embodiments of the present disclosure.

Figure 1:
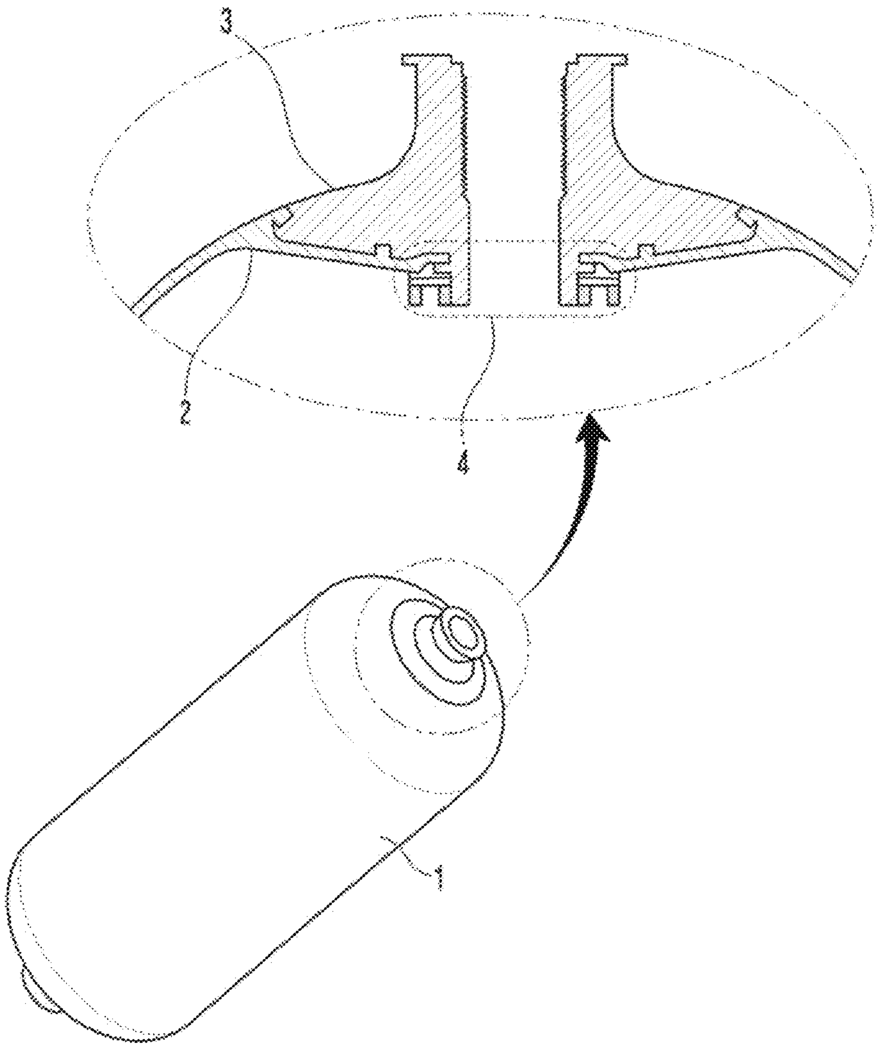
FIGS. 1 and 2 are cross-sectional views for illustrating a nozzle portion of a hydrogen tank.
Figure 2:
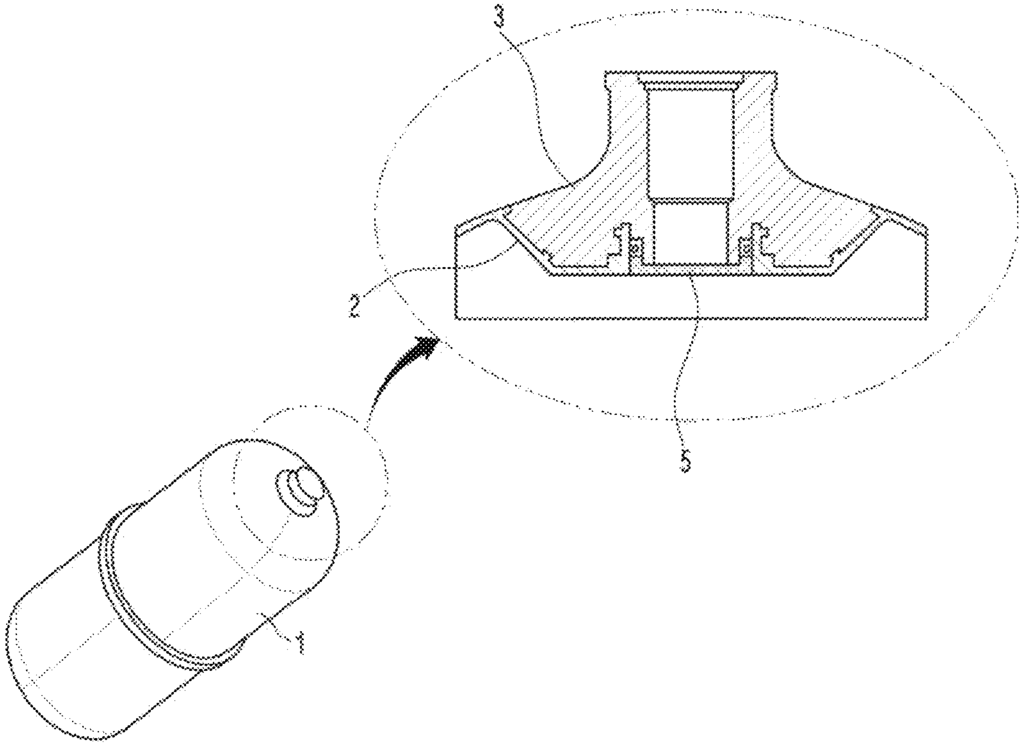
Figure 3:
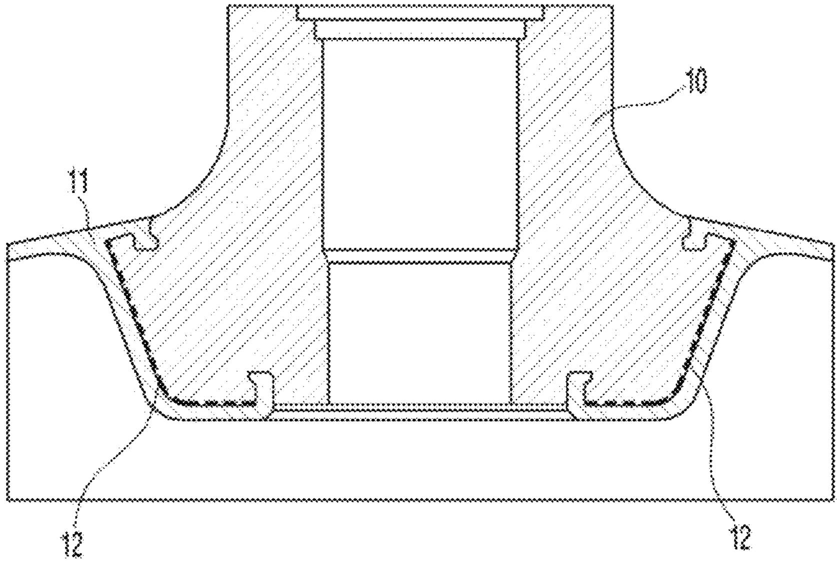
FIG. 3 is a cross-sectional view for illustrating a sealless nozzle portion of a hydrogen tank.
Figures 4A, 4B, 4C:
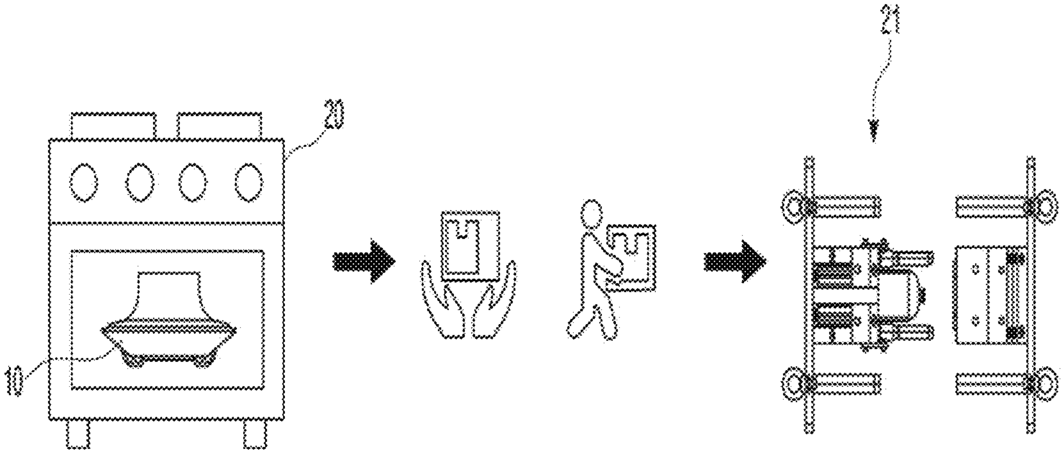
FIGS. 4A-4C are schematic views for illustrating the process of inserting a sealless nozzle into an injection mold for a hydrogen tank.
Figure 5:
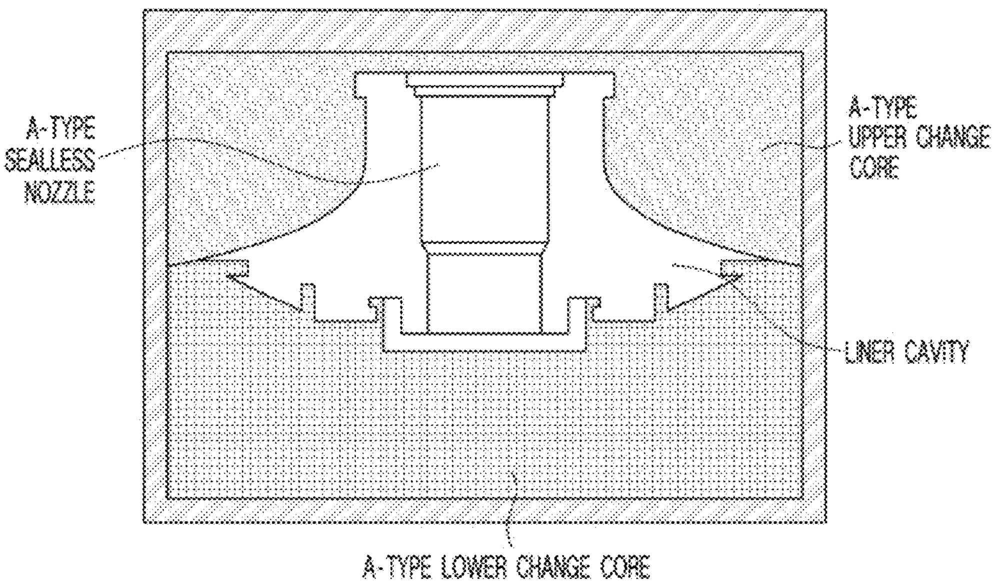
FIG. 5 is a partial cross-sectional view for illustrating the structure of upper and lower change cores into which a sealless nozzle of an injection mold for a hydrogen tank has been inserted.

It may be understood that the appended drawings are not necessarily to scale, presenting a somewhat simplified representation of various features illustrative of the basic principles of embodiments of the present disclosure. The specific design features of embodiments of the present disclosure as included herein, including, for example, specific dimensions, orientations, locations, and shapes, will be determined in part by the particularly intended application and use environment.

In the figures, the same reference numerals refer to the same or equivalent parts of embodiments of the present disclosure throughout the several figures of the drawings.

DETAILED DESCRIPTION OF ILLUSTRATIVE EMBODIMENTS

Because various changes can be made to embodiments of the present disclosure and a range of embodiments can be made for the present disclosure, specific embodiments will be illustrated and described in the drawings. Color versions of the figures can be found in the publication of the Korean priority document. However, this is not intended to limit the present disclosure to the specific embodiments, and it should be understood that the present disclosure includes all changes, equivalents, and substitutes within the technology and the scope of the present disclosure.

The terms "module" and "unit" used in the present disclosure are merely used to distinguish the names of components, and they should not be interpreted as assuming that the components have been physically or chemically separated or can be so separated.

Terms containing ordinal numbers such as "first" and "second" may be used to describe various components, but the components are not limited by the terms. The above-mentioned terms can be used only as names to distinguish one component from another component, and the order therebetween can be determined by the context in the descriptions thereof, not by such names.

The expression "and/or" is used to include all possible combinations of multiple items being addressed. For example, by "A and/or B," all three possible combinations are meant: "A," "B," and "A and B."

When a component is said to be "coupled" or "connected" to another component, it means that the component may be directly coupled or connected to the other component or there may be other components therebetween.

The terms used herein are only used to describe specific embodiments and are not intended to limit the present disclosure. Expressions in the singular form include the meaning of the plural form unless they clearly mean otherwise in the context. In the present disclosure, expressions such as "comprise" or "have" are intended to indicate the presence of features, numbers, steps, operations, components, parts, or combinations thereof described herein, and they should not be understood as precluding the possibility of the presence or the addition of one or more other features, numbers, steps, operations, components, parts, or combinations thereof.

Unless otherwise defined, all terms used herein, including technical or scientific terms, have meanings commonly understood by a person having ordinary skill in the technical field to which the present disclosure pertains. Terms defined in commonly used dictionaries should be interpreted as having meanings consistent with the meanings they have in the context of the relevant technology, and they should not be interpreted in an ideal or overly formal sense unless explicitly defined in the present disclosure.

In addition, a unit, a control unit, a control device, or a controller is only a term widely used to name devices for controlling a certain function and do not mean a generic function unit. For example, devices with these names may include a communication device that communicates with other controllers or sensors to control a certain function, a computer-readable recording medium that stores an operating system, logic instructions, input/output information, etc., and one or more processors that perform operations of determination, calculation, making decisions, etc. required to control the function.

Meanwhile, the processor may include a semiconductor integrated circuit and/or electronic devices that carry out operations of at least one of comparison, determination, calculation, and making decisions to perform a programmed function. For example, the processor may be any one or a combination of a computer, a microprocessor, a CPU, an ASIC, and an electronic circuit such as circuitry and logic circuits.

Examples of a computer-readable recording medium (or simply called a memory) may include all types of storage devices for storing data that can be read by a computer system. For example, they may include at least one of a memory such as a flash memory, a hard disk, a micro memory, and a card memory, e.g., a secure digital card (SD card) or an eXtream digital card (XD card), and a memory such as a random access memory (RAM), a static ram (SRAM), a read-only memory (ROM), a programmable ROM (PROM), an electrically erasable PROM (EEPROM), a magnetic RAM (MRAM), a magnetic disk, and an optical disk.

Such a recording medium may be electrically connected to the processor, and the processor may load and write data from the recording medium. The recording medium and the processor may be integrated or physically separate.

Hereafter, with reference to the attached drawings, each component in a desirable embodiment of the present disclosure will be described in detail.

Change Core Module

Figure 6:
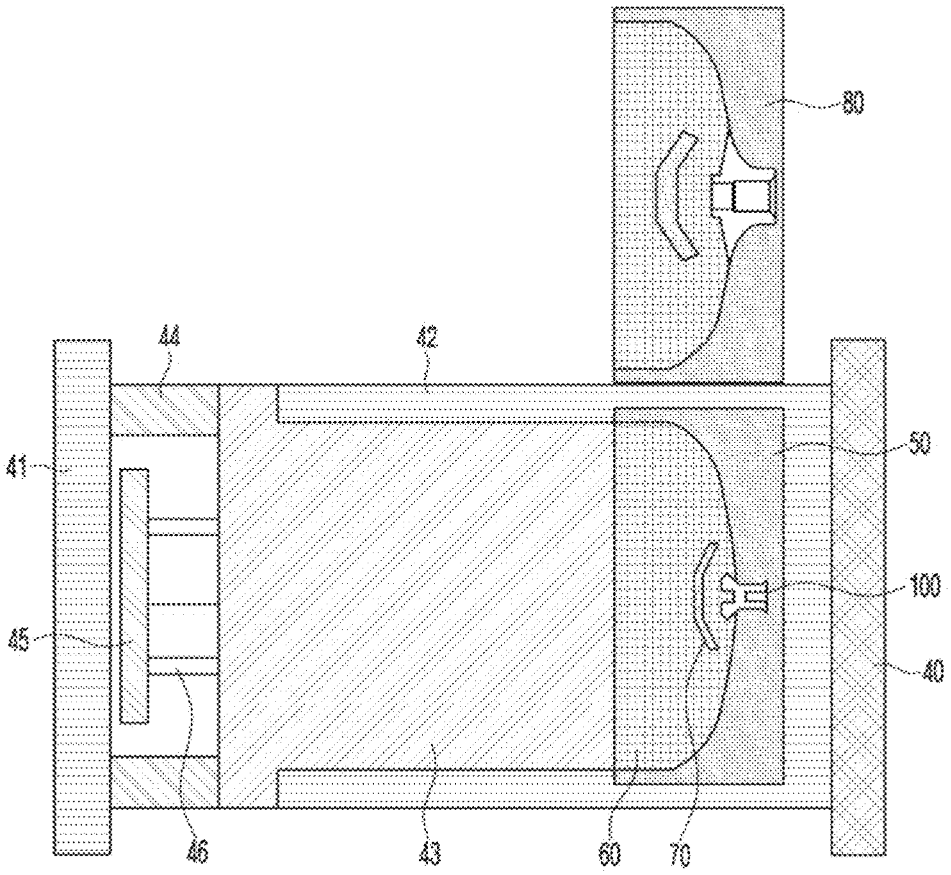
FIGS. 6 and 7 are views for illustrating a change core module of an injection mold for a hydrogen tank according to embodiments of the present disclosure.

As shown in FIG. 6, upper and lower templates 42 and 43 of an injection mold for a hydrogen tank according to embodiments of the present disclosure may be vertically coupled to each other, and upper and lower change cores 50 and 60 may be built between the upper and lower templates.

In addition, an upper mounting plate 40 may be formed on the upper part of the upper template 42, and an ejector pin 46 supported by a bottom plate 45 may be formed in a space created by a space block 44 between the lower template 43 and a lower mounting plate 41.

In particular, an insert sealless nozzle 100 may be inserted between the upper and lower change cores 50 and 60, and an induction heating unit 70 may be built in the lower change core 60.

In addition, a change core module 80 may include the upper and lower change cores 50 and 60, the sealless nozzles 100 in various designs, which is inserted between the upper and lower change cores 50 and 60, and the induction heating unit 70 built in the lower change core 60.

The change core module 80 may be prepared for each insert sealless nozzle 100 and formed to be simply and easily replaced in the injection mold.

Induction Heating Unit

Figure 7:
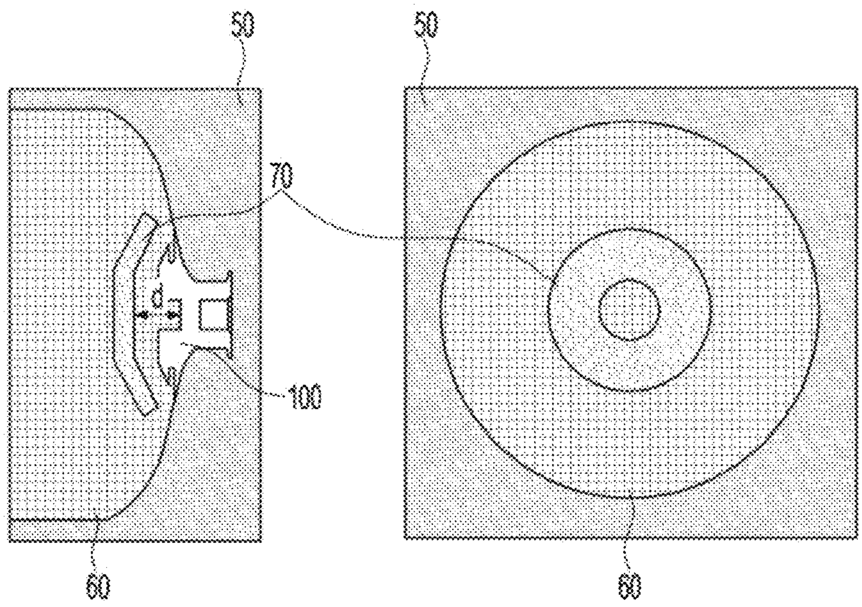

The induction heating unit 70 may be built into the lower change core 60 as shown in FIG. 7 and may heat the insert sealless nozzle 100 to a temperature of approximately 160° C. or higher by inductively heating the lower change core 60.

Here, the induction heating unit 70 may perform induction heating to uniformly heat the entire surface of the insert sealless nozzle 100, so the method of arranging a coil may be most important.

In particular, a distance d between the induction heating unit 70 and the insert sealless nozzle 100 may be desirably 10 to 15 mm.

The induction heating unit 70 built into the lower change core 60 may exhibit significant differences in variation, tendency, etc. in heating for the insert sealless nozzle 100 depending on how a coil is arranged.

Embodiments of the present disclosure may be designed to derive a desirable structure in which a coil of the induction heating unit 70 is arranged from experiments thereon.

Experimental Example 1

Figure 8:
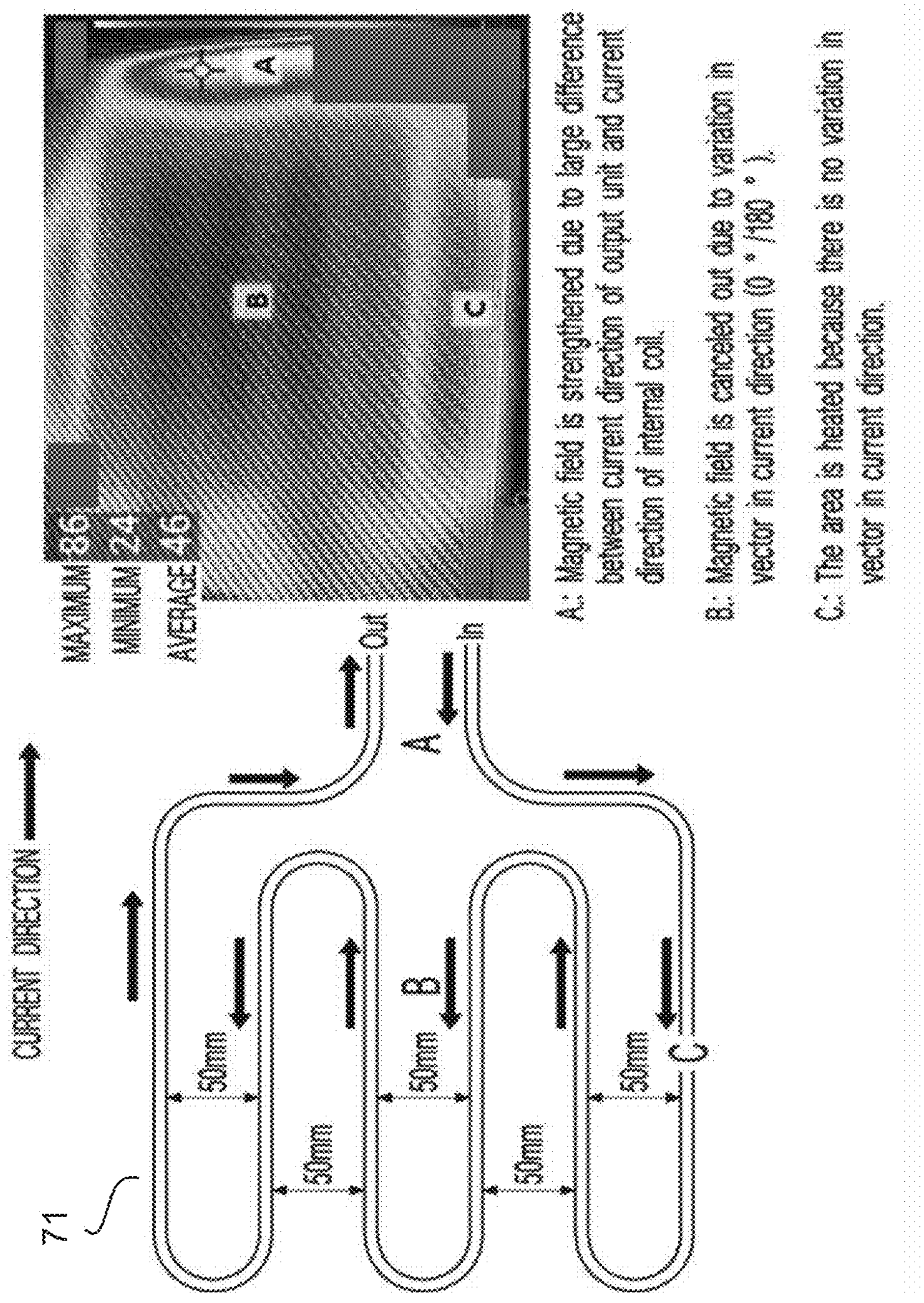
FIGS. 8 to 14 are views for illustrating experimental examples of an induction heating unit of the change core module of the injection mold for a hydrogen tank according to embodiments of the present disclosure.

In Experimental Example 1, a coil 71 may be arranged in series as shown in FIG. 8, forming a distance of approximately 50 mm between coil channels.

The analysis of the heating tendency in such a structure where the coil 71 is arranged shows that, in area A in FIG. 8, a magnetic field may have been strengthened because there was a large difference between the current direction of the output unit and the current direction of the internal coil.

In FIG. 8, area B, which is an unheated area, may not have been heated at all as the magnetic field was canceled out due to the variation in the vector in the current direction (0°/180°), and area C may have been heated because there was no variation in the vector in the current direction.

Experimental Example 2

Figure 9:
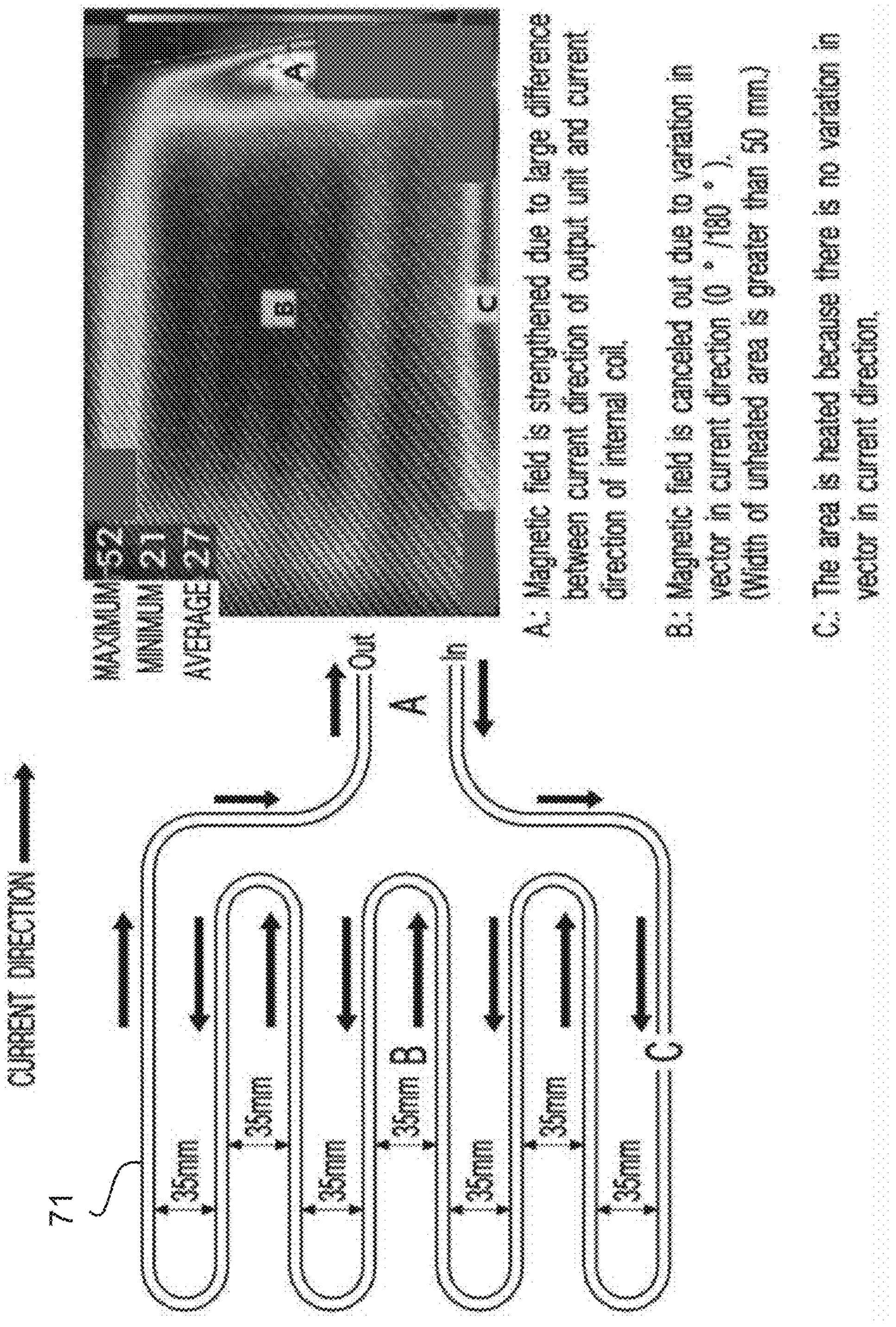

In Experimental Example 2, the coil 71 may be arranged in series as shown in FIG. 9, forming a distance of approximately 35 mm between coil channels.

The analysis of the heating tendency in such a structure where the coil 71 is arranged shows that, in area A in FIG. 9, a magnetic field may have been strengthened because there was a large difference between the current direction of the output unit and the current direction of the internal coil.

In FIG. 9, area B, which is an unheated area, may not have been heated at all as the magnetic field was canceled out due to the variation in the vector in the current direction (0°/180°) and, in particular, may be wider than area B in Experimental Example 1, and area C may have been heated because there was no variation in the vector in the current direction.

Experimental Example 3

Figure 10:
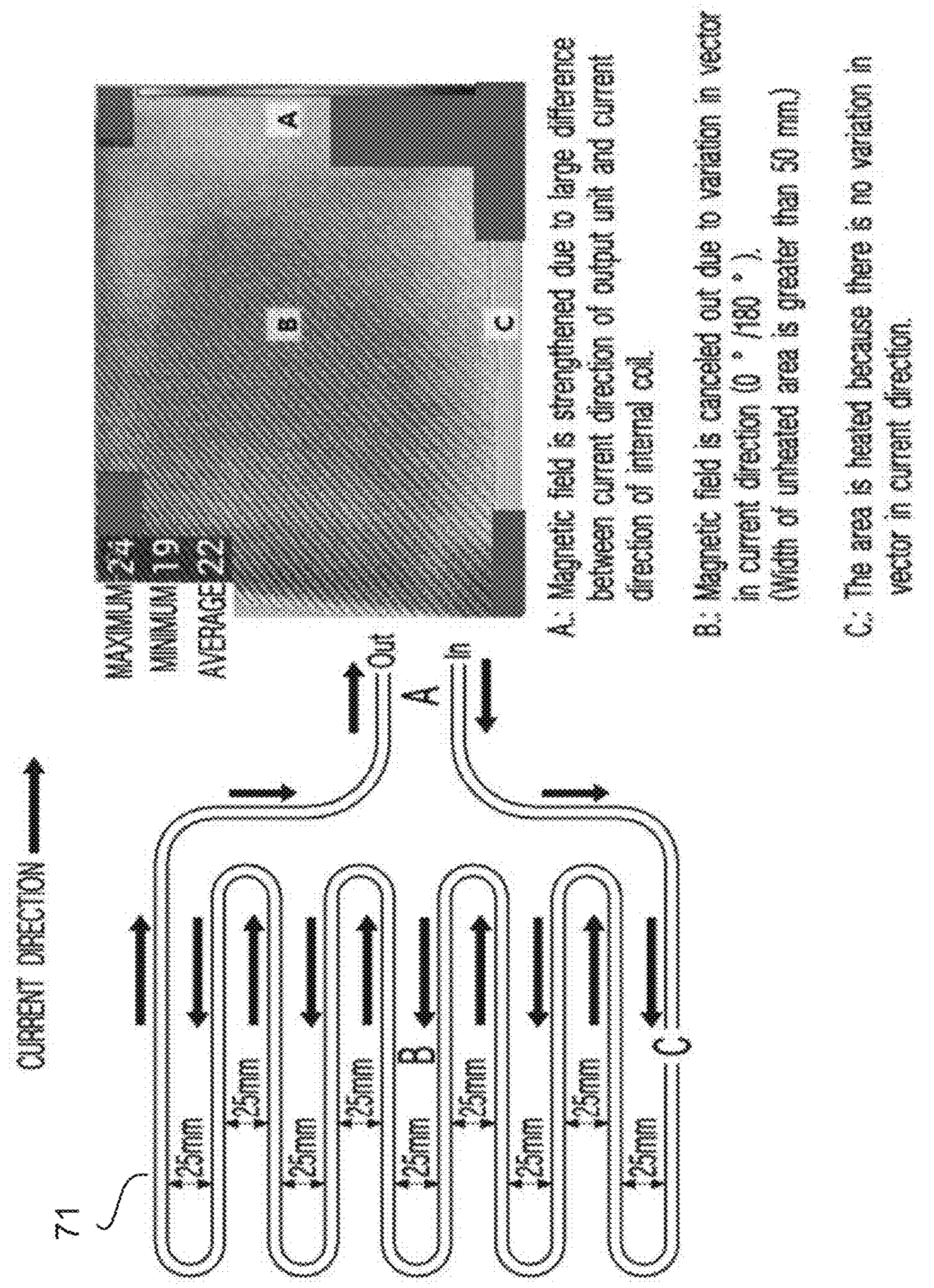

In Experimental Example 3, the coil 71 may be arranged in series as shown in FIG. 10, forming a distance of approximately 25 mm between coil channels.

The analysis of the heating tendency in such a structure where the coil 71 is arranged shows that, in area A in FIG. 10, a magnetic field may have been strengthened because there was a large difference between the current direction of the output unit and the current direction of the internal coil.

In FIG. 10, area B, which is an unheated area, may not have been heated at all as the magnetic field was canceled out due to the variation in the vector in the current direction (0°/180°) and, in particular, may be wider than area B in Experimental Example 1, and area C may have been heated because there was no variation in the vector in the current direction.

Results of an Experiment with a Coil Arranged in Series

Figure 11:
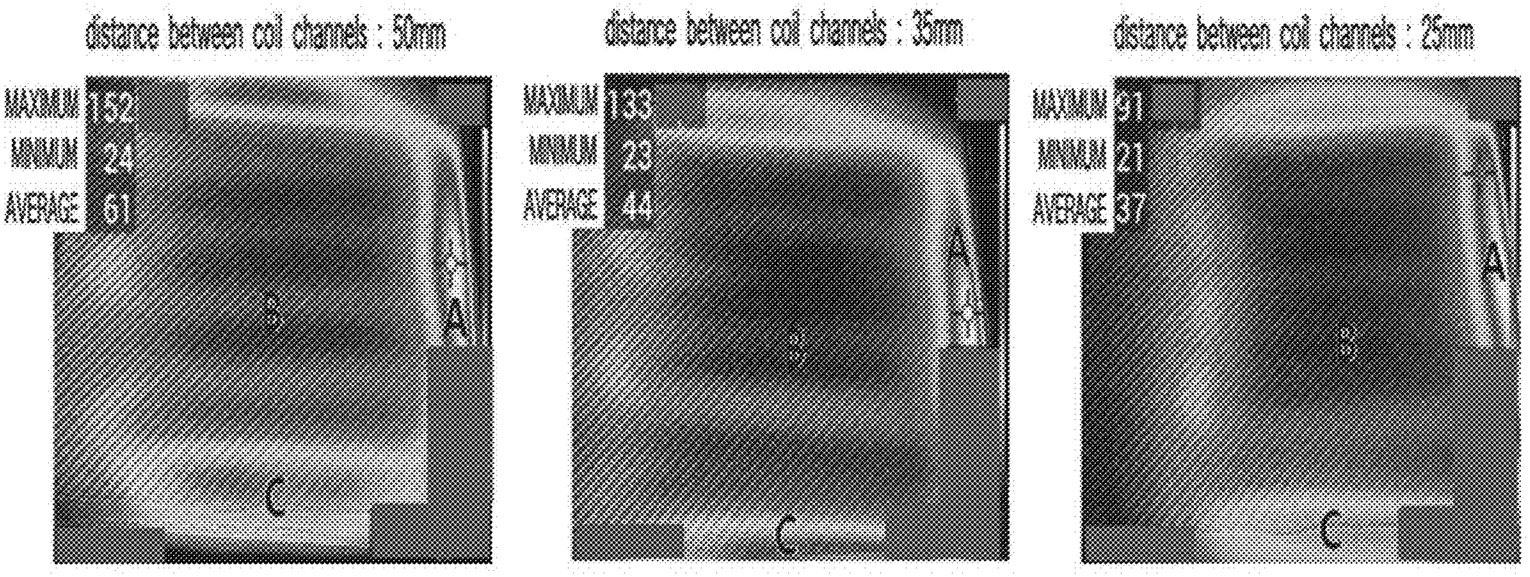

The analysis of the heating tendency in the structure where the coil 71 is arranged in series as in Experimental Examples 1 to 3 shows that, in area A, the variation in the direction of the current applied to the coil channels adjacent to each other may be approximately 180° and induction heating on a plane surface may not occur, as shown in FIG. 11.

In addition, in area B, which is an unheated area, as the distance between the coil channels adjacent to each other becomes shorter, the unheated area may increase.

Experimental Example 4

Figure 12:
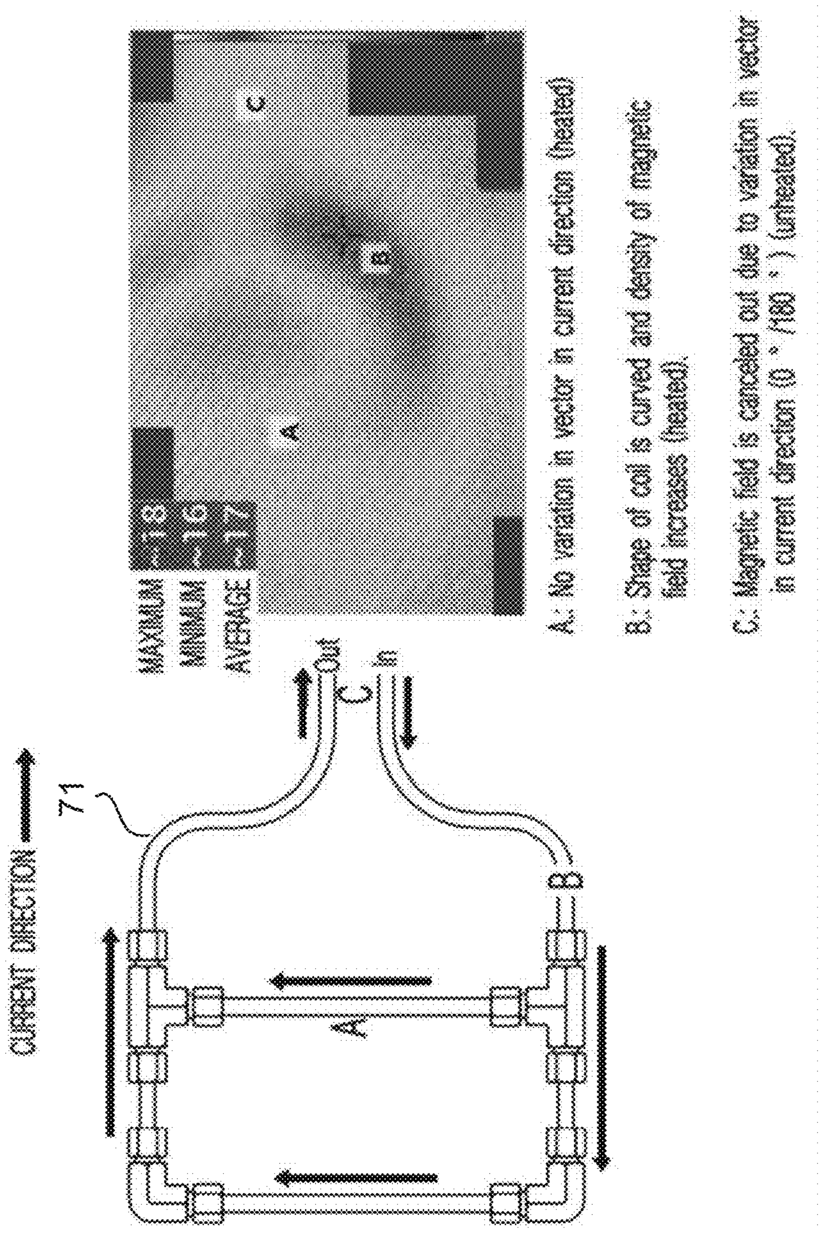

In Experimental Example 4, as shown in FIG. 12, the coils 71 may be arranged in parallel, and two parallel channels may be arranged side by side on a straight line.

The analysis of the heating tendency in such a structure where the coils 71 are arranged in parallel shows that, in area A in FIG. 12, which is a heated area, there may have been no variation in the vector in the current direction, and area B, which is a heated area, may have been heated as the shape of the coil was curved and the density of a magnetic field increased.

Area C, which is an unheated area, may not have been heated as the magnetic field was canceled out due to the variation in the vector in the current direction (0°/180°).

Experimental Example 5

Figure 13:
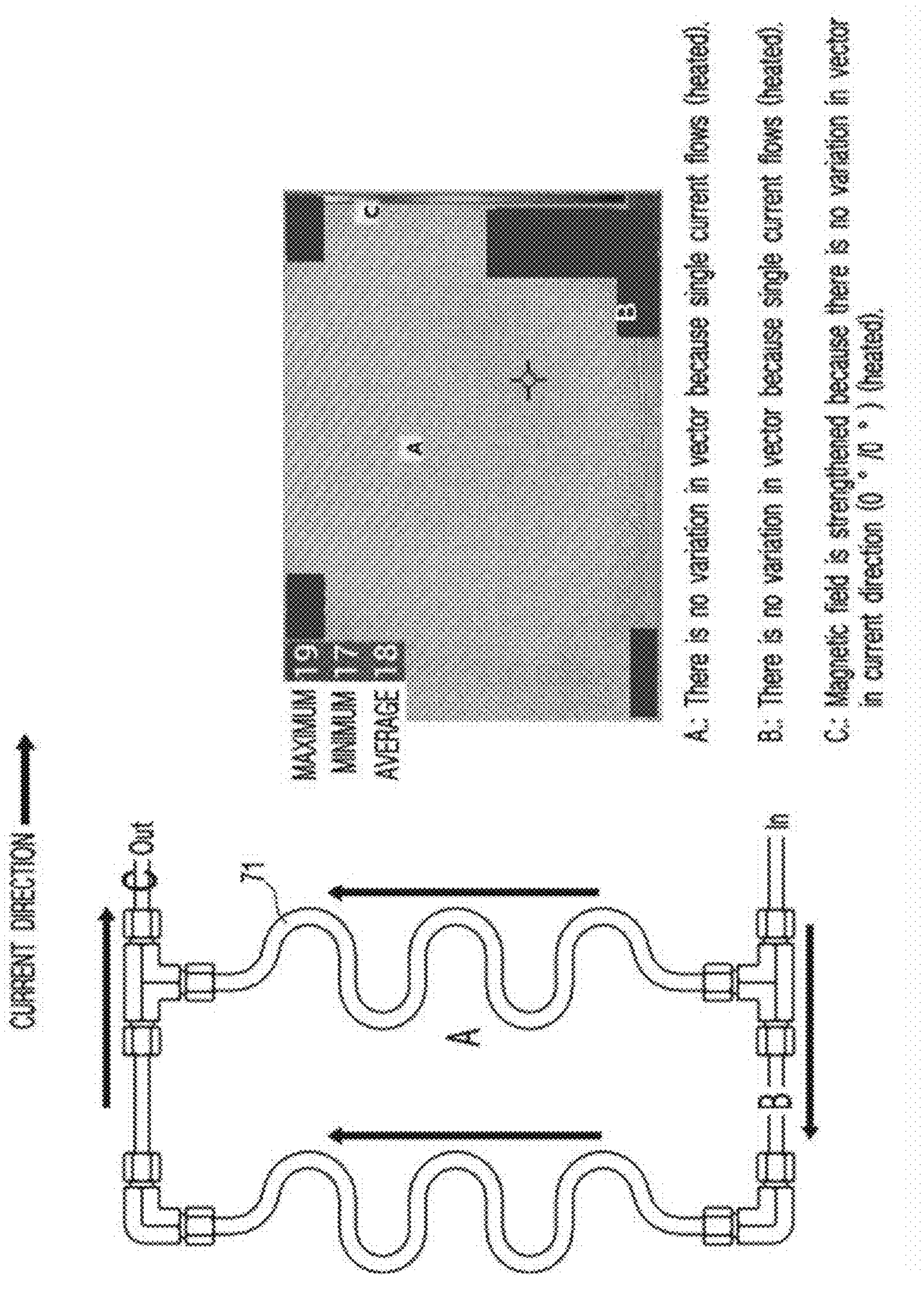

In Experimental Example 5, as shown in FIG. 13, the coils 71 may be arranged in parallel, and two parallel channels may form a zigzag curve.

The analysis of the heating tendency in such a structure where the coils 71 are arranged in parallel shows that, in area A in FIG. 13, which is a heated area, there may have been no variation in vector because a single current flowed, and in area B, which is a heated area, there may have been no variation in vector because a single current flowed.

In area C in FIG. 13, which is a heated area, because there was no variation (0°/0°) in the vector in the current direction, a magnetic field may have been strengthened.

Areas A, B, and C have been all heated to a uniform temperature without variation in heating, so it can be deemed that the coils 71 have been desirably arranged.

Experimental Example 6

Figure 14:
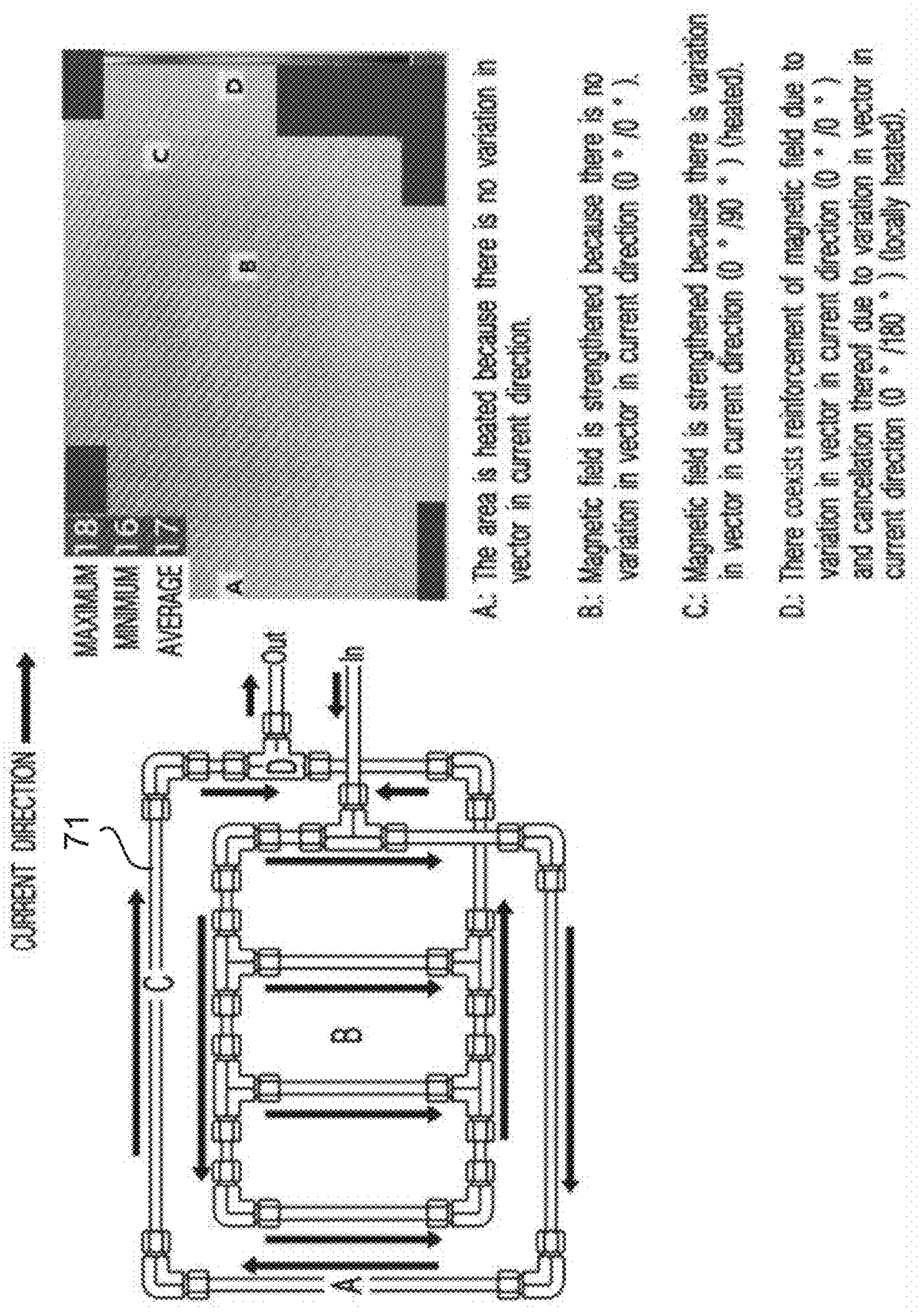

In Experimental Example 6, as shown in FIG. 14, the coils 71 may be arranged in parallel, and a coil channel may be formed in the center.

The analysis of the heating tendency in such a structure where the coils 71 are arranged in parallel shows that, in area A in FIG. 14, which is a heated area, there may have been no variation in the vector in the current direction and a magnetic field may have been strengthened and that, in area B, because there was no variation (0°/0°) in the vector in the current direction, the magnetic field may have been strengthened.

In area C in FIG. 14, which is a heated area, the magnetic field may have been reinforced due to the variation in the vector in the current direction (0°/90°), and in area D, which is a locally heated area, there may coexist the reinforcement of the magnetic field due to the variation in the vector in the current direction (0°/0°) and the cancellation thereof due to the variation in the vector in the current direction (0°/180°).

Results of an Experiment with a Coil Arranged in Parallel

In Experimental Example 4, as shown in FIG. 12, there may be variation in heating because there may coexist the heated areas and the unheated area, and, in Experimental Example 6, as shown in FIG. 14, there may also be variation in heating because there may coexist the heated areas and the locally heated area.

In particular, in Experimental Example 5, as shown in FIG. 13, all the areas may have been heated, and the heating areas may have been heated to a uniform temperature without variation.

In conclusion, Experimental Example 5 can be deemed to suggest a desirable example of how the coils 71 should be arranged for the induction heating unit 70.

Induction Heating Process

Figure 15:
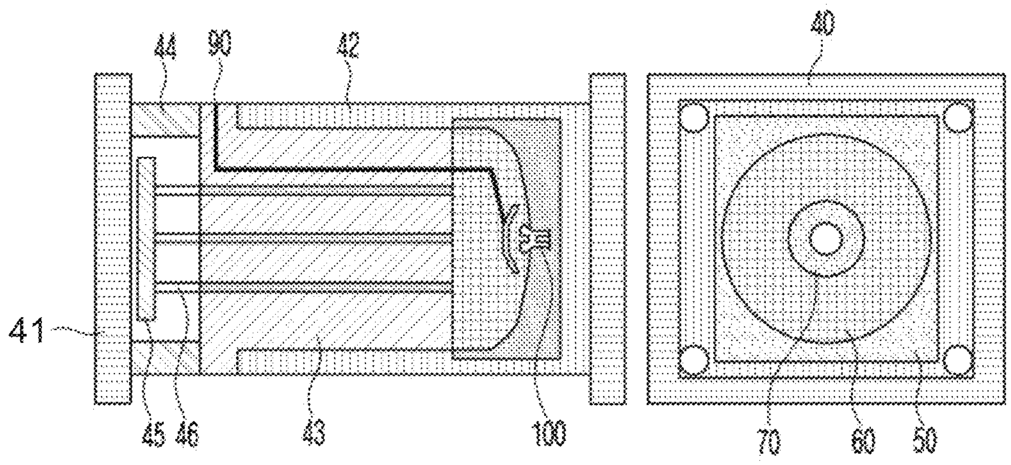
FIGS. 15 and 16 are views for illustrating the induction heating unit of the change core module of the injection mold for a hydrogen tank according to embodiments of the present disclosure.

As shown in FIG. 15, when power is applied to an induction heating inlet line 90 with the upper and lower templates 42 and 43 closed, induction heating of the coil 71 may begin as power is supplied to the induction heating unit 70, and it may be possible to measure the temperature of the insert sealless nozzle 100, which is being heated, through the induction heating inlet line 90 connected to a temperature sensor (not shown).

Figure 16:
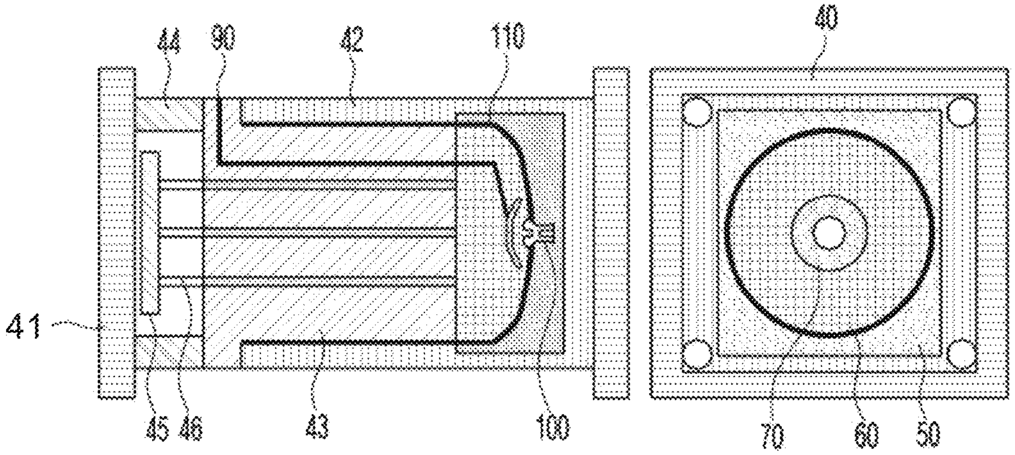

In addition, when the insert sealless nozzle 100 is heated to a temperature of approximately 160° C. by inductive heating of the induction heating unit 70, as shown in FIG. 16, while the temperature of the induction heating unit 70 inductively heated is maintained, resin may be injected through the space between the upper and lower templates 42 and 43 and the space between the upper and lower change cores 50 and 60 to form a liner injection molded product 110 for a hydrogen tank.

Change Core Module Coupling Apparatus

As shown in FIG. 6, the change core module 80 may include the upper and lower change cores 50 and 60 and the insert sealless nozzle 100, which have been connected to each other; insert sealless nozzles in various designs may be inserted into the change core module 80; and it may be possible to replace the change core module 80 with the upper and lower templates 42 and 43 closed.

Figure 17:
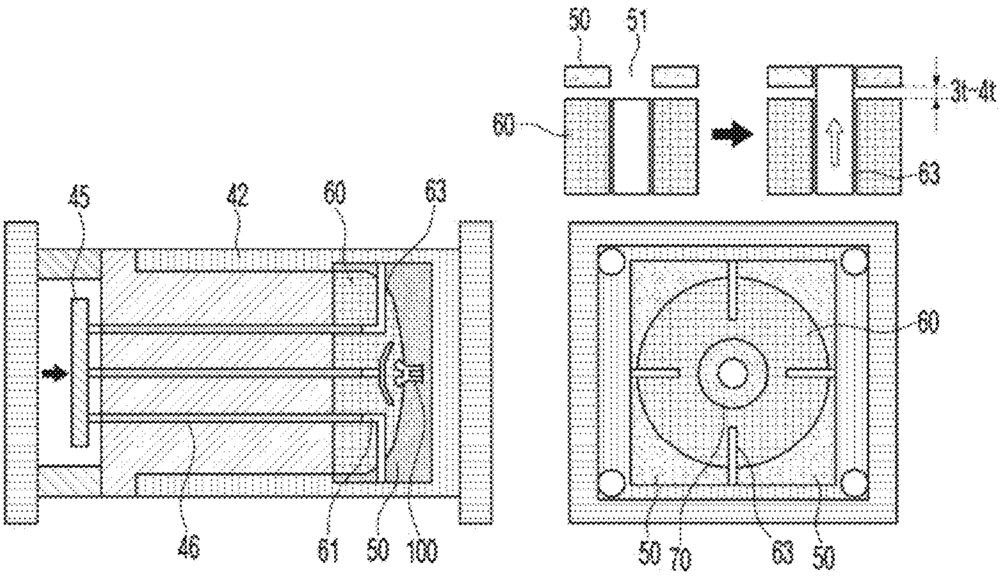
FIGS. 17 to 21 are views for illustrating a change core module coupling apparatus of the injection mold for a hydrogen tank according to the present disclosure.

Here, as shown in FIG. 17, the distance between the upper and lower change cores 50 and 60 may be 3t to 4*t*, which is the thickness of the liner injection molded product 110 for a hydrogen tank.

As shown in FIG. 17, in a change core module coupling apparatus, when four horizontal movement pins 61 are moved forward in a horizontal direction by four ejector pins 46 of the bottom plate 45, four vertical movement pins 63 may be moved in the radial direction of the lower change core 60 and inserted into coupling holes 51 of the upper change core 50.

Here, the change core module coupling apparatus may be designed to couple the upper change core 50 with the lower change core 60 by inserting the four vertical movement pins 63 into the coupling holes 51 of the upper change core 50 while the four horizontal movement pins 61 are moved forward in a horizontal direction.

Figure 18:
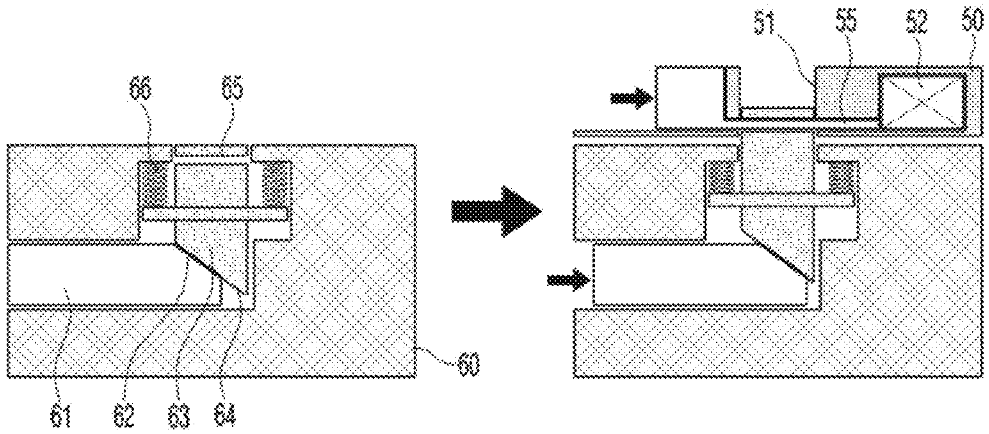

More specifically, as shown in FIG. 18, the change core module coupling apparatus may enable a driving slope 62 to slide along a driven slope 64 when the horizontal movement pin 61 is moved forward by driving the ejector pin 46, so as to push up the vertical movement pin 63.

Here, in the change core module coupling apparatus, the four vertical movement pins 63 may be provided in the radial direction in the lower change core 60 and may be designed to move in the radial direction.

In particular, the four vertical movement pins 63 may move vertically and elastically while being supported by a compression spring 66 and may be designed to compress the compression spring 66 when moving vertically by the horizontal movement pin 61.

Here, when the vertical movement pin 63 moves vertically and elastically and protrudes out of the outer surface of the lower change core 60 to be inserted into the coupling hole 51 of the upper change core 50, a slit bar 55 may penetrate a slot hole 65 of the vertical movement pin 63.

In other words, when the vertical movement pin 63 moves vertically and elastically and the slot hole 65 is inserted into the coupling hole 51 of the upper change core 50, a magnetic force of a first driving unit 52 built into the upper change core 50 may act on the slit bar 55 through the slot hole 65 and pull the slit bar to allow it to penetrate the slot hole 65.

Here, the first driving unit 52 may be an electromagnet unit and may be designed to drive the slit bar 55 by generating an attractive force for pulling the slit bar 55 or a repulsive force for pushing it.

As such, when the slit bar 55 passes through the slot hole 65 and supports the vertical movement pin 63, even with the horizontal movement pin 61 removed, the vertical movement pin 63 may continue to be inserted into the coupling hole 51 of the upper change core 50 despite the compressive elastic force of the compression spring 66.

Figure 19:
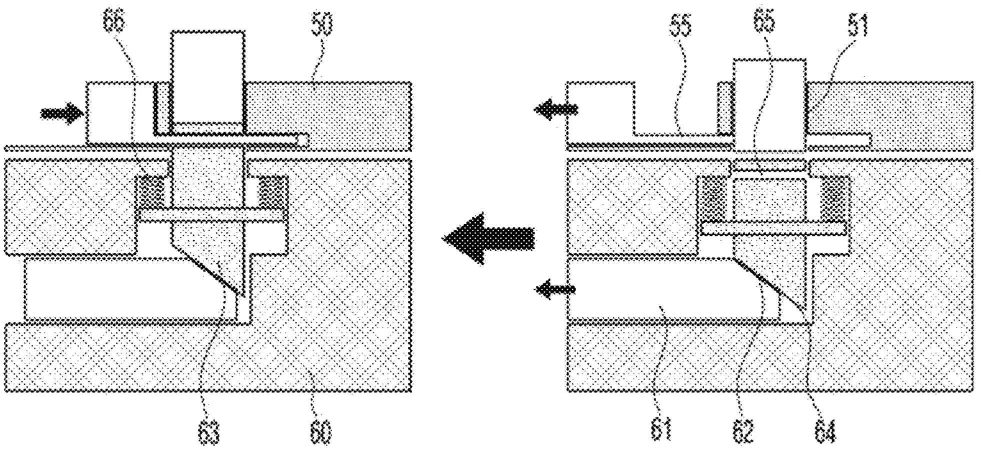

As shown in FIG. 19, in the change core module coupling apparatus, when the slit bar 55 is moved backward and comes out of the slot hole 65, the vertical movement pin 63 may move vertically by the compressive elastic force of the compression spring 66.

Here, the driven slope 64 of the vertical movement pin 63 may press the driving slope 62 downward, so that the driving slope 62 may cause the horizontal movement pin 61 to move backward while sliding along the driven slope 64.

Figure 20:
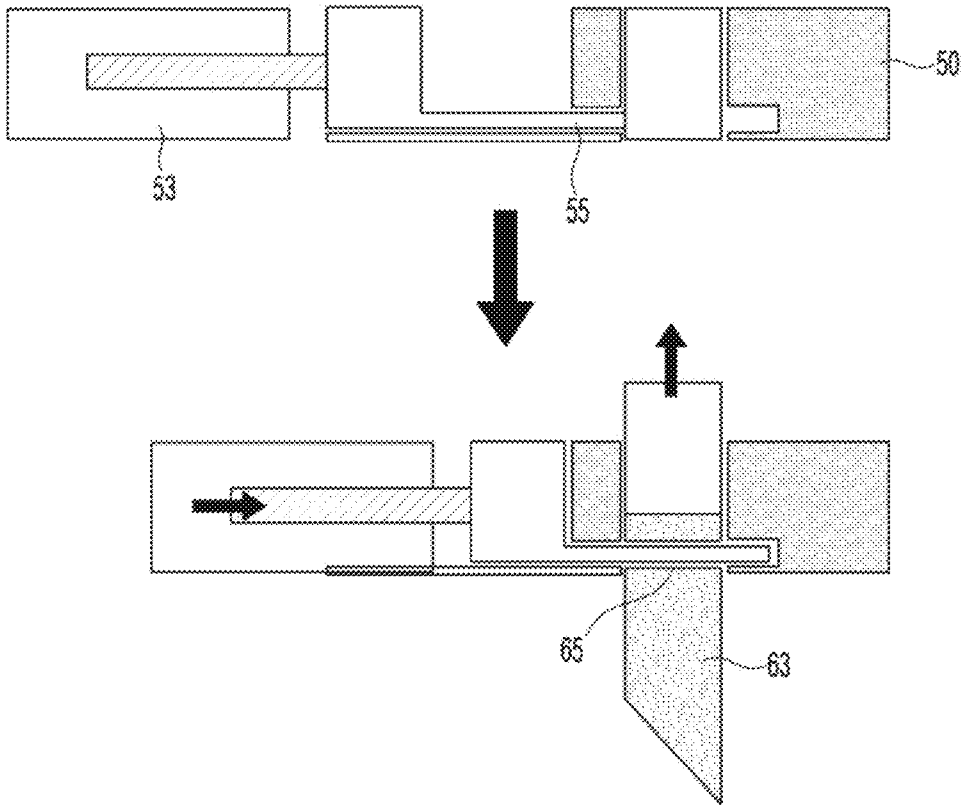

In addition, as shown in FIG. 20, in the change core module coupling apparatus, the slit bar 55 may be driven along the slot hole 65 by a second driving unit 53.

Here, a hydraulic or pneumatic cylinder may be applied to the second driving unit 53, and the rod of the hydraulic or pneumatic cylinder may be connected to the slit bar 55 for the slit bar to move back and forth.

Figure 21:
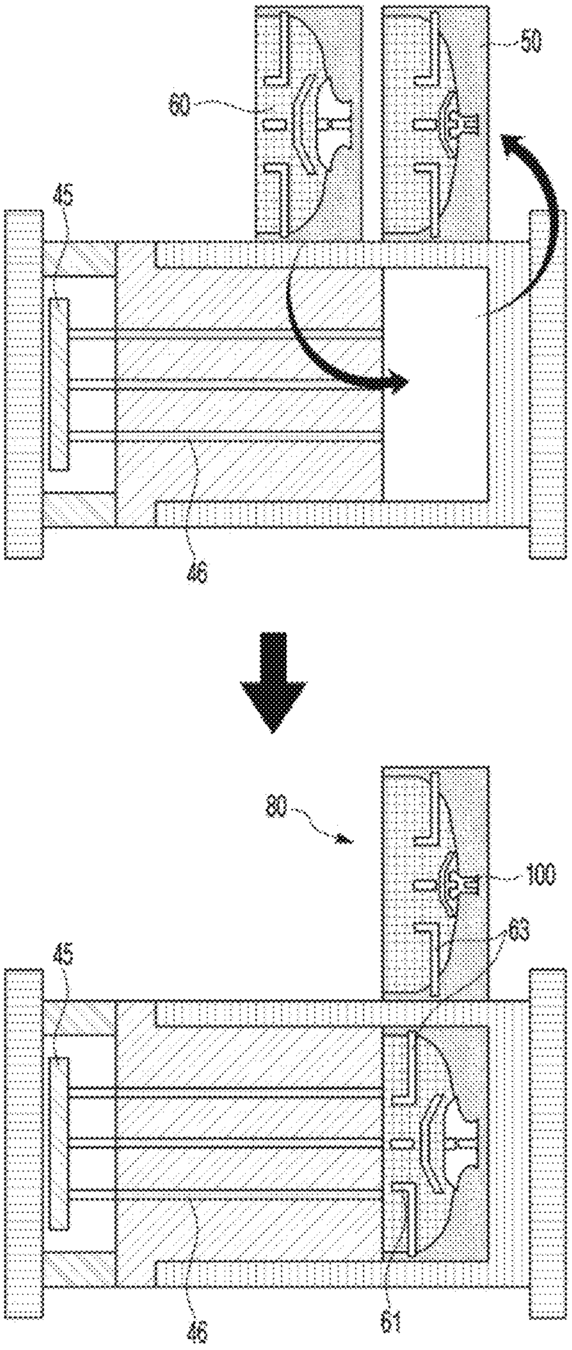

Meanwhile, as for the process of replacing a change core module, as shown in FIG. 21, as the vertical movement pin 63 may be moved vertically by the horizontal movement pin 61, the slit bar 55 of the first and second driving units 52 and 53 may penetrate the slot hole 65 to continue to be inserted into the coupling hole 51 of the upper change core 50, so that the upper and lower change cores 50 and 60 of the change core module 80 may be coupled to each other.

The upper and lower change cores 50 and 60 of the change core module 80 to be substituted may have been coupled to each other by the vertical movement pin 63 as described above, and, after a change core module mounted on an injection mold may be simply detached from the injection mold using a lifting unit, another change core module may be easily inserted into the injection mold using the lifting unit.

Here, as shown in FIG. 19, when the slit bar 55 of the change core module 80 inserted into the injection mold is moved backward and separated from the slot hole 65, as the vertical movement pin 63 comes out of the coupling hole 51 of the upper change core 50, the upper and lower change cores 50 and 60 may be separated. In this state, the injection mold may be opened to begin molding work.

As such, according to embodiments of the present disclosure, it may be possible to replace the change core module 80 without stopping injection work or disassembling an injection mold, thereby improving work efficiency and productivity for injection molding.

The desirable embodiments of the present disclosure have been examined, and it is obvious to a person having ordinary skill in the art that the present disclosure can be embodied in other specific forms in addition to the embodiments described above within its technology or scope. Therefore, the above-described embodiments are to be deemed illustrative and not restrictive, and the present disclosure is not limited to the description but may be modified within the scope of the appended claims and their equivalents.

The foregoing descriptions of the specific exemplary embodiments of the present disclosure have been presented for the purposes of illustration and description. They are not intended to be exhaustive or to limit the present disclosure to the precise forms disclosed, and obviously many modifications and variations are possible in light of the above-described teachings. The exemplary embodiments were chosen and described to explain certain principles of embodiments of the present disclosure and their practical application, to enable others skilled in the art to make and utilize the various exemplary embodiments of the present disclosure, as well as various alternatives and modifications thereof. It is intended that the scope of the present disclosure be defined by the claims appended hereto and their equivalents.

What is claimed is:

1. An apparatus for injection molding a liner of a hydrogen tank, the apparatus comprising:

a first change core;

a second change core configured to receive a sealless nozzle between the first change core and the second change core; and an induction heating device disposed in the first change core and configured to inductively heat the sealless nozzle when the sealless nozzle is inserted between the first change core and the second change core;

wherein the apparatus is configured to inject a resin into an injection mold while maintaining the sealless nozzle in a heated state to form a liner having an interface joint with the sealless nozzle.

2. The apparatus of claim 1, wherein the apparatus is configured so that a distance between the induction heating device and the sealless nozzle is 10 to 15 mm when the sealless nozzle is inserted between the first change core and the second change core.

3. The apparatus of claim 1, wherein the induction heating device is configured to heat the sealless nozzle to a temperature of 160° C. or higher.

4. The apparatus of claim 1, wherein the induction heating device comprises a coil embedded in the first change core, the coil being arranged in parallel.

5. The apparatus of claim 4, wherein the induction heating device comprises two or more parallel channels arranged side by side.

6. The apparatus of claim 5, wherein the two or more parallel channels define a zigzag curve.

7. The apparatus of claim 4, wherein the coil is arranged such that no variation in a vector of current flow occurs.

8. The apparatus of claim 3, further comprising:

an induction heating inlet line configured to apply electricity to the induction heating device; and a temperature sensor connected to the induction heating inlet line.

9. The apparatus of claim 1, further comprising a coupling apparatus configured to couple the first change core and the second change core.

10. An injection mold for forming a liner of a hydrogen tank, the injection mold comprising:

the apparatus of claim 1; and a first template and a second template in which the apparatus is disposed, wherein the first template and the second template define a space for injection molding of the liner, and wherein the apparatus is configured to heat the sealless nozzle during injection molding of the liner.

11. A method of injection molding a liner of a hydrogen tank by injecting a resin into an injection mold, the method comprising:

inserting a sealless nozzle between a first change core and a second change core;

inductively heating the sealless nozzle using an induction heating device disposed in the first change core; and injecting the resin while maintaining the sealless nozzle in a heated state to form a liner having an interface joint with the sealless nozzle.

12. The method of claim 11, wherein a distance between the induction heating device and the sealless nozzle is 10 mm to 15 mm.

13. The method of claim 11, wherein the induction heating device heats the sealless nozzle to a temperature of 160° C. or higher.

14. The method of claim 11, wherein the induction heating device comprises a coil embedded in the first change core, the coil being arranged in parallel.

15. The method of claim 14, wherein the coil comprises two or more parallel channels arranged side by side.

16. The method of claim 15, wherein the two or more parallel channels define a zigzag curve.

17. The method of claim 14, wherein the coil is arranged such that no variation in a vector of current flow occurs.

18. The method of claim 11, wherein the resin is injected while a temperature of the sealless nozzle is maintained at 160° C. or higher.

19. The method of claim 11, further comprising:

coupling the first change core and the second change core;

mounting a change core module in which the first change core and the second change core are coupled into the injection mold;

releasing coupling between the first change core and the second change core while the change core module is mounted in the injection mold; and injecting the resin to perform injection molding of the liner in a state in which the first change core and the second change core are separated.

20. The method of claim 11, wherein the resin is injected between a first template and a second template of the injection mold and between the first change core and the second change core to form the liner.

* * * * *